United States Patent
Down, Jr. et al.

(10) Patent No.: US 8,706,859 B2
(45) Date of Patent: Apr. 22, 2014

(54) METHOD AND APPARATUS OF DATA CENTER FILE SYSTEM

(75) Inventors: Robert Eugene Down, Jr., Kirkland, WA (US); William Zietzke, Covington, WA (US); Dan Ritchie, Issaquah, WA (US); Yoshiki Kano, Bellevue, WA (US)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 13/074,269

(22) Filed: Mar. 29, 2011

(65) Prior Publication Data

US 2012/0254861 A1 Oct. 4, 2012

(51) Int. Cl.
*G06F 15/173* (2006.01)
*G06F 9/455* (2006.01)

(52) U.S. Cl.
USPC .............................. 709/223; 709/224; 718/1

(58) Field of Classification Search
USPC ............ 718/1; 711/112, 6, 162; 709/223, 224
See application file for complete search history.

(56) References Cited

U.S. PATENT DOCUMENTS

| | | | |
|---|---|---|---|
| 7,096,325 B2 | 8/2006 | Kano | |
| 7,143,146 B2 | 11/2006 | Nakatani et al. | |
| 7,555,644 B2 | 6/2009 | Bharathy et al. | |
| 8,359,594 B1* | 1/2013 | Davidson et al. | 718/1 |
| 2006/0184937 A1* | 8/2006 | Abels et al. | 718/1 |
| 2009/0276774 A1* | 11/2009 | Kinoshita | 718/1 |
| 2010/0153617 A1* | 6/2010 | Miroshnichenko et al. | 711/6 |
| 2010/0250878 A1* | 9/2010 | Ichikawa et al. | 711/162 |
| 2011/0107025 A1* | 5/2011 | Urkude et al. | 711/112 |
| 2012/0191929 A1* | 7/2012 | Zietzke et al. | 711/162 |
| 2012/0192175 A1* | 7/2012 | Dorai et al. | 718/1 |

* cited by examiner

*Primary Examiner* — Jungwon Chang

(74) *Attorney, Agent, or Firm* — Mattingly & Malur, PC

(57) ABSTRACT

Embodiments of the invention provide a capability to validate volume status on the host and storage system stored virtual machine image in the datacenter management server. In one embodiment, a server system includes a storage system having a plurality of volumes, a plurality of host systems, and a management server coupled with the storage system and the host systems via a network. A method of managing the server system comprises: generating a golden image in the storage system corresponding to a virtual machine image file; copying virtual machine data from the golden image to some of the plurality of volumes in the storage system; and keeping track, by the management server, of status of the volumes which have copied virtual machine data by monitoring activity of the virtual machines.

20 Claims, 15 Drawing Sheets

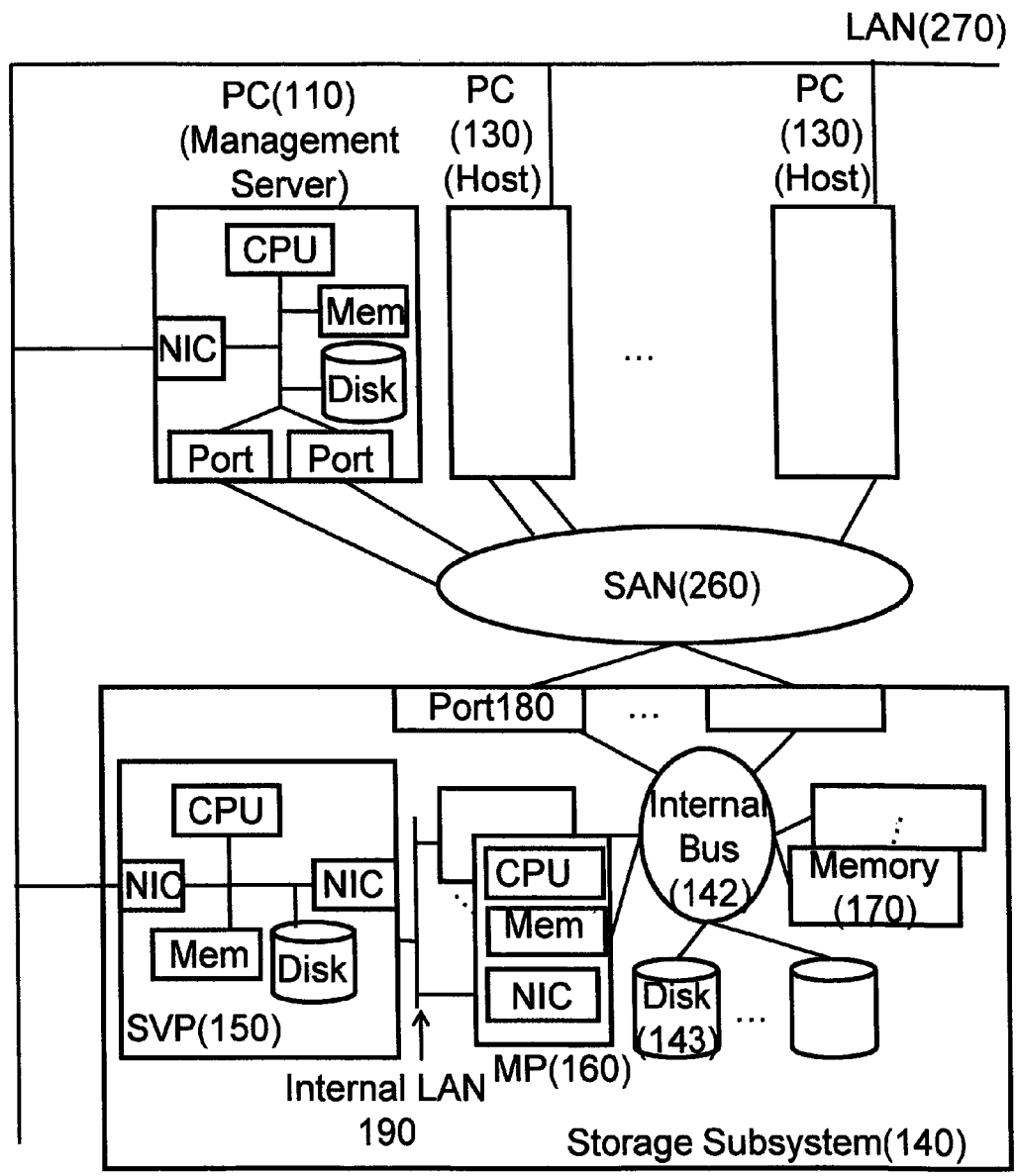
Figure.1(Physical Configuration)

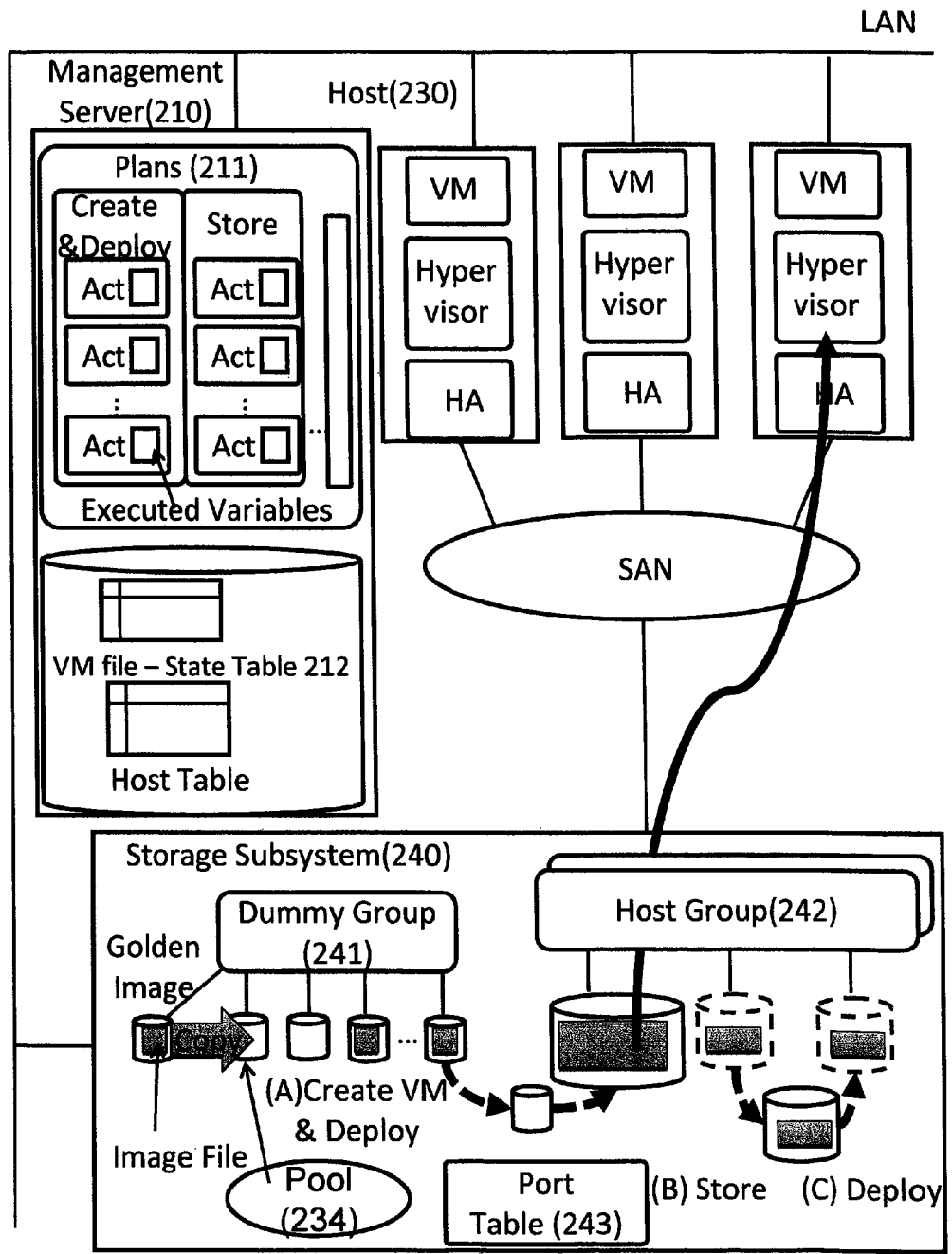
Figure. 2 Logical Configuration

| Port # (301) | Host Group# (302) | Name (303) | Host WWNs (304) | LUN (305) | VOL # (306) |
|---|---|---|---|---|---|
| 0 | 1 | Dummy 1 | 0x0000 000000 000001 | 01 | 01 |
| ... | ... | ... | ... | ... | ... |
| 0 | 1 | Host1_ Port1 | 0x1000 00051E EDFC9A , ... | 01 | 100 |
| ... | ... | ... | ... | ... | ... |
| 1 | 1 | Host1_ Port2 | 0x1000 00051E EDFC9B , .. | 01 | 100 |

Figure. 3 Port Configuration

| Filename (401) | Signature(402) | State (403) | Golden Image(404) | VOL # (405) | LUN (411) | Port (412) |
|---|---|---|---|---|---|---|
| VM1.VHD | XXXXXXXX-XXXX-XXXX-XXXX-XXXXXXXXXXXX | Stateful | | 1 | 10 | 1 |
| VM2.VHD | YYYYYYYY-YYYY-YYYY-YYYY-YYYYYYYYYYYY | Stateless | | 2 | 11 | 1 |
| VM3.VHD | ZZZZZZZZ-ZZZZ-ZZZZ-ZZZZ-ZZZZZZZZZZZZ | Stateless | | 2 | 11 | 1 |
| VM4.VHD | ZZZZZZZZ-ZZZZ-ZZZZ-ZZZZ-ZZZZZZZZZZZZ | Stateless | | 100 | 01 | 1 |
| VMG.VHD | 00000000-0000-0000-0000-000000000000 | Stateful | x | 99 | 99 | 1 |
| ... | ... | ... | | ... | ... | |

| Target Host (406) | Target Core (407) | VM Operation State(408) | Current Step Operation (409) | Status(410) |
|---|---|---|---|---|
| Host1 | 1 | Storing | Detach VOL | Success |
| Host1 | 2 | Deployed | - | Success |
| - | - | Stored | - | Success |
| Host2 | 1 | Deploying | Validate Cluster WWN | Failure (Recovering |
| - | - | - | - | - |
| ... | ... | ... | ... | ... |

Figure 4  VM File Table

| Host (501) | Core (502) | Status(503) |
|---|---|---|
| Host1 | 1 | VM1, VM2 |
| | 2 | VM4 |
| | 3 | VM5 |
| | 4 | VM13 |
| Host2 | 1 | Reserved (VM33) |
| | 2 | ... |
| | 3 | ... |
| | 4 | ... |
| ... | ... | ... |
| | ... | ... |
| | ... | ... |
| | ... | ... |

Figure 5  Host List

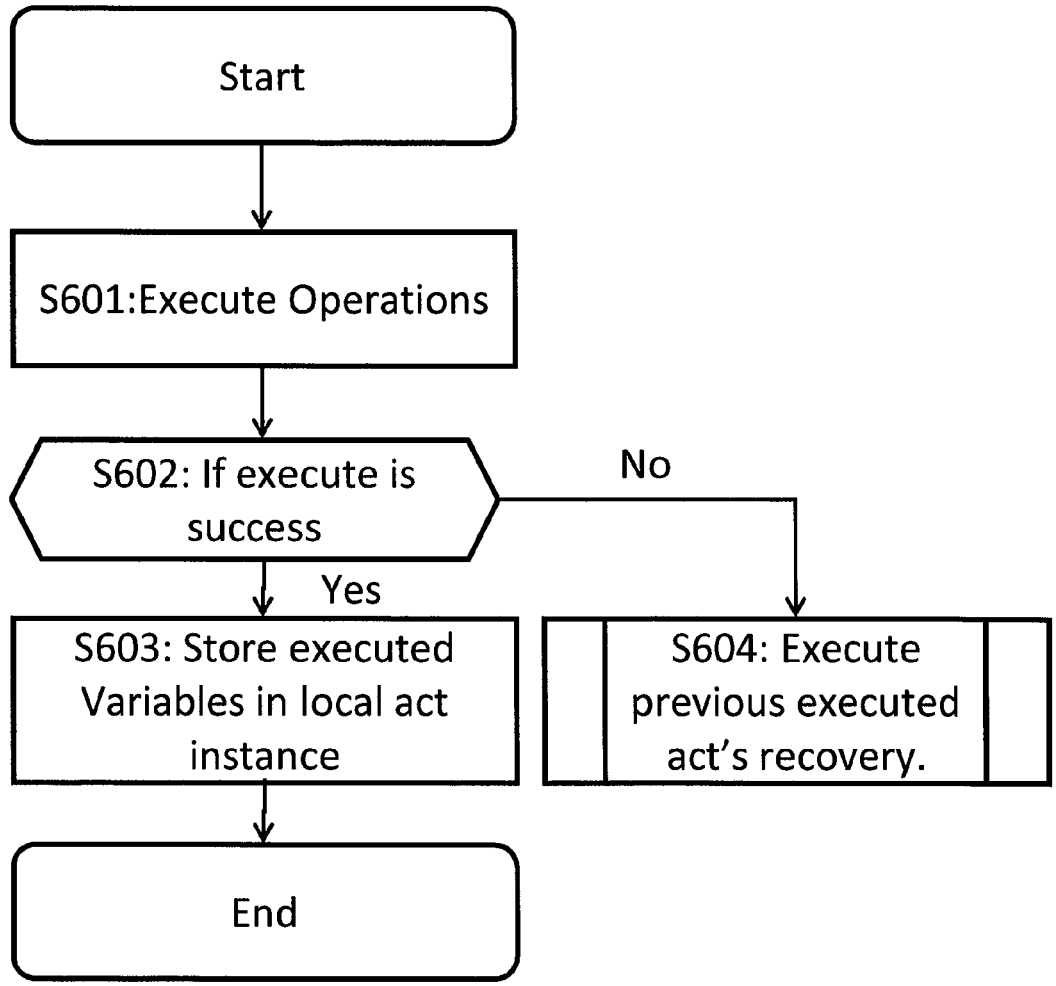
Figure 6  Basic Act Operation (Normal)

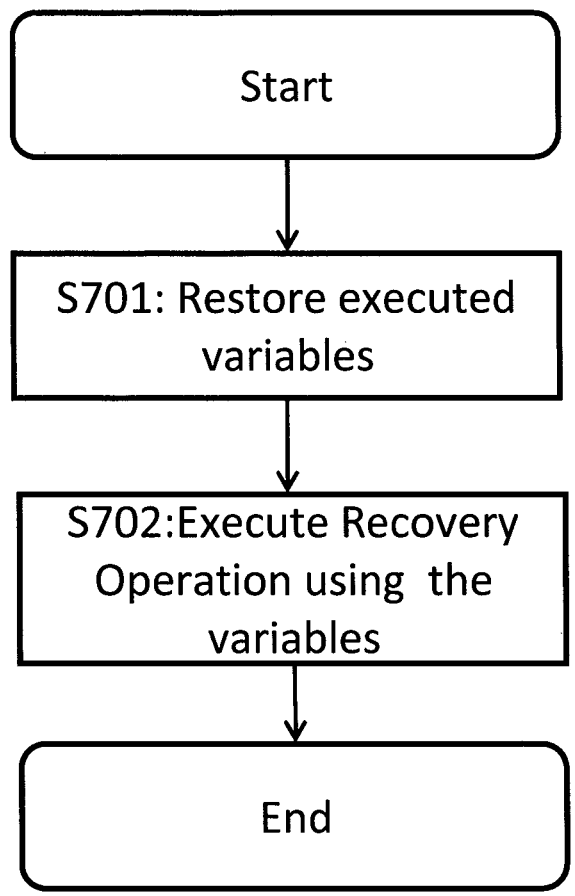
Figure 7. Basic Act Operation (Recovery)

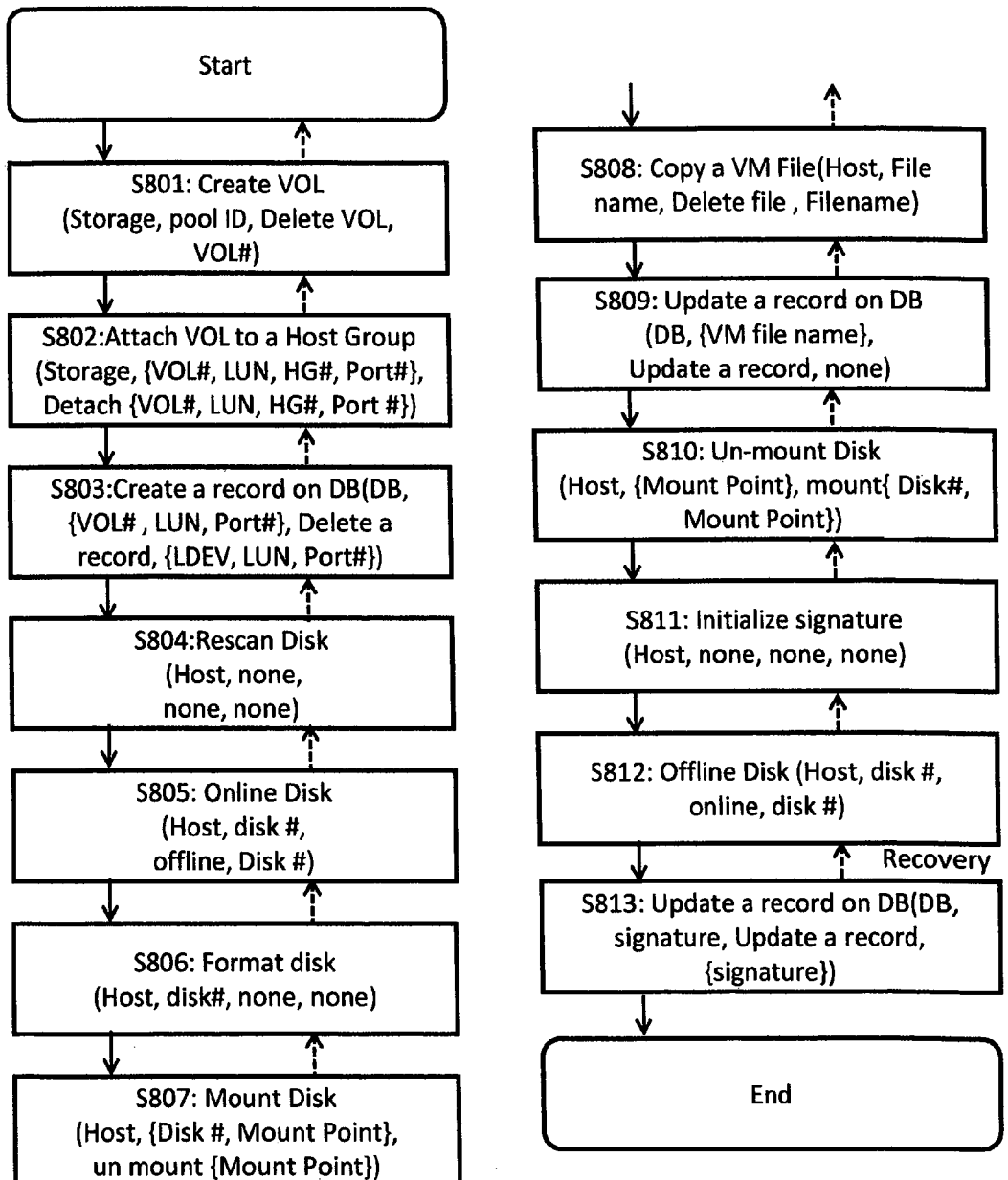
Figure 8 Create Golden Image

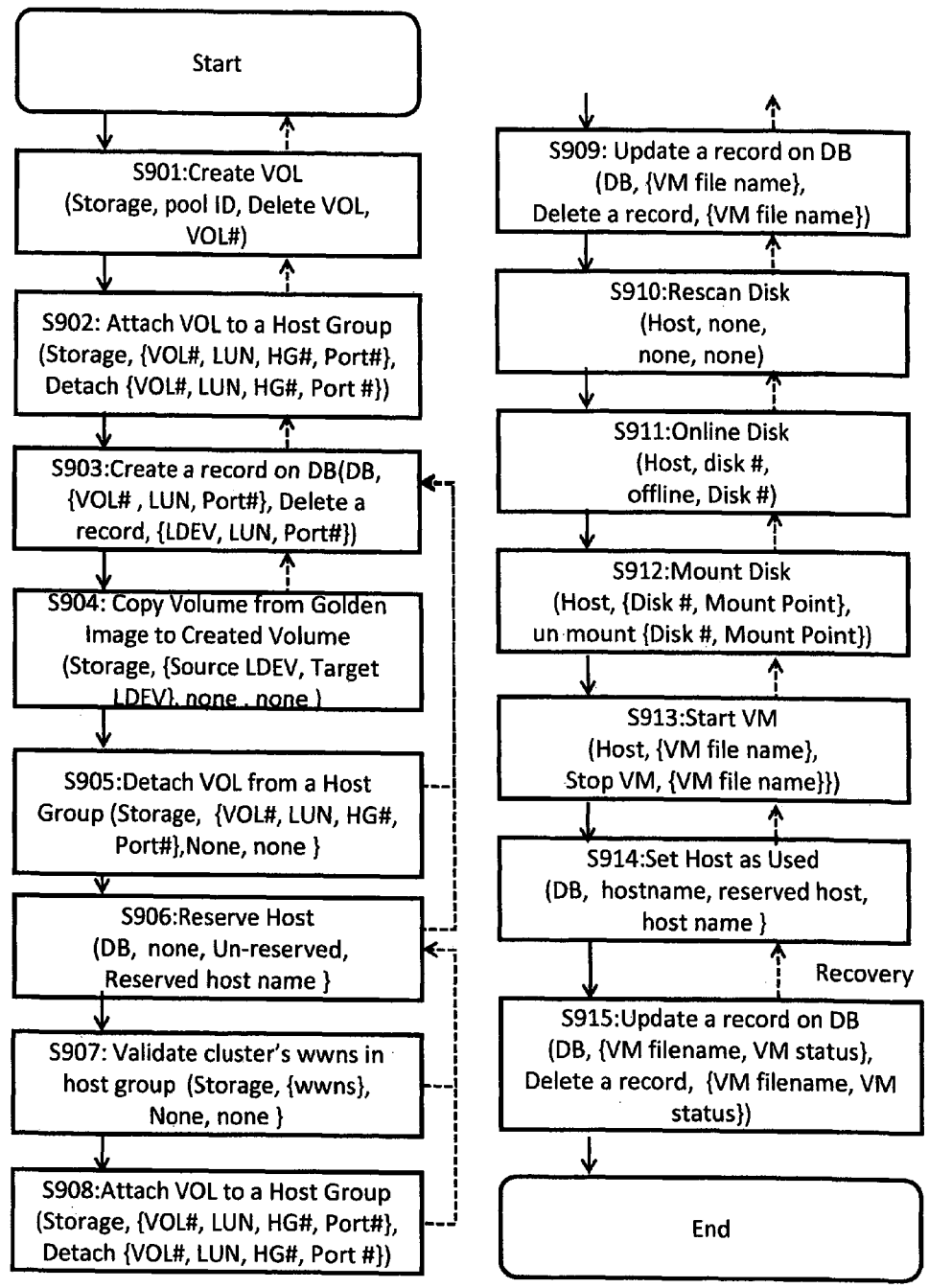
Figure 9 Create & Deploy VM

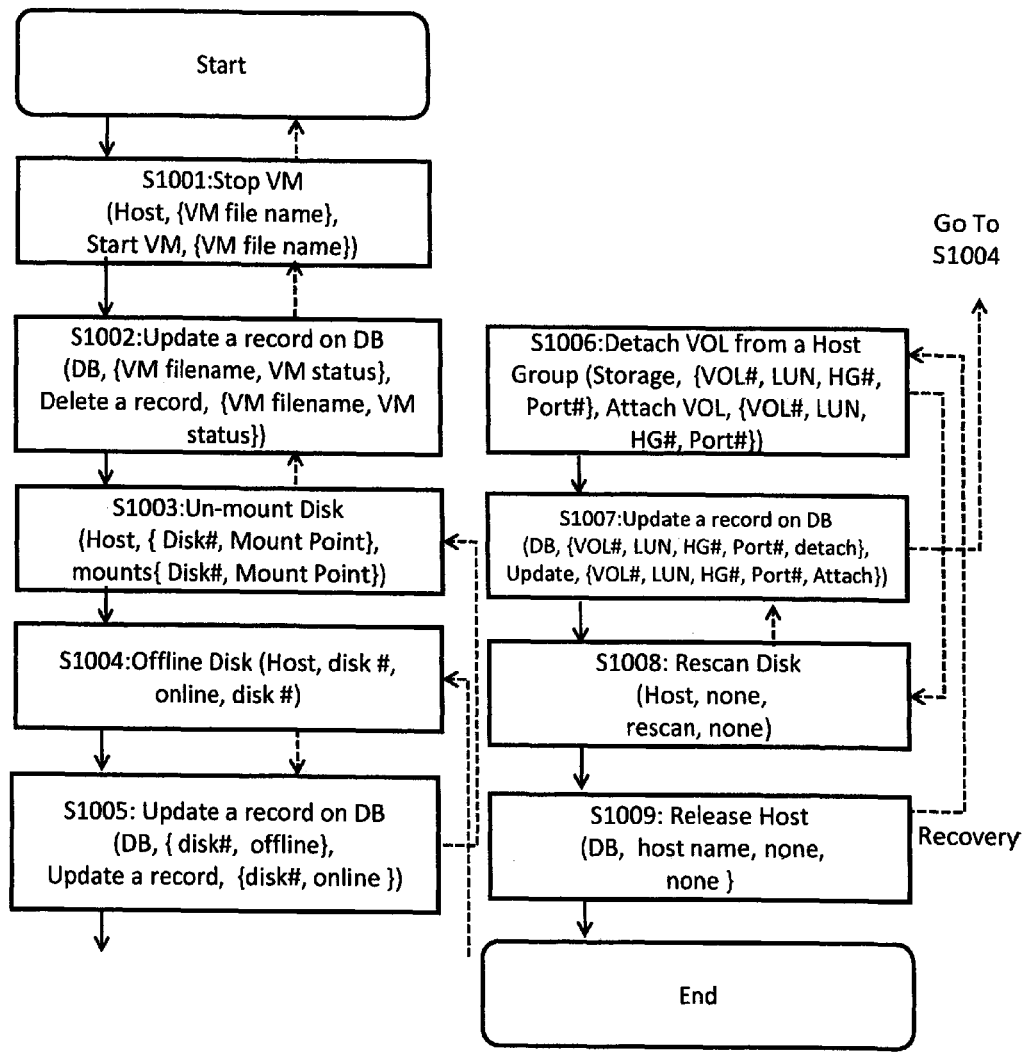
Figure 10 Store VM

| Equipment | Operation | Error Condition |
|---|---|---|
| Host | Mount | If already mount point is used |
| | Un-Mount | If already disk is un-mount |
| | Bring Online Disk | If already disk is online. |
| | Bring Offline Disk | If the disk is not existed |
| Storage | Attach VOL | If the LUN already is attached |
| | Detach VOL | If the LUN already is detached. |

Figure 11  Operation of Error Condition for each equipment

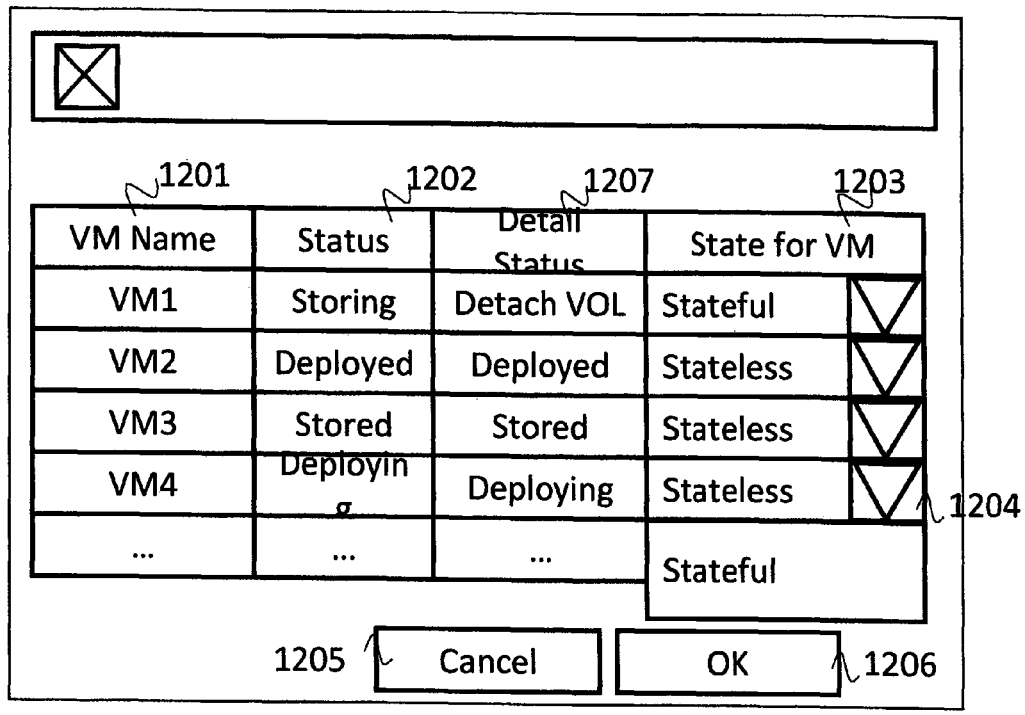
Figure 12  GUI example to change stateful or stateless

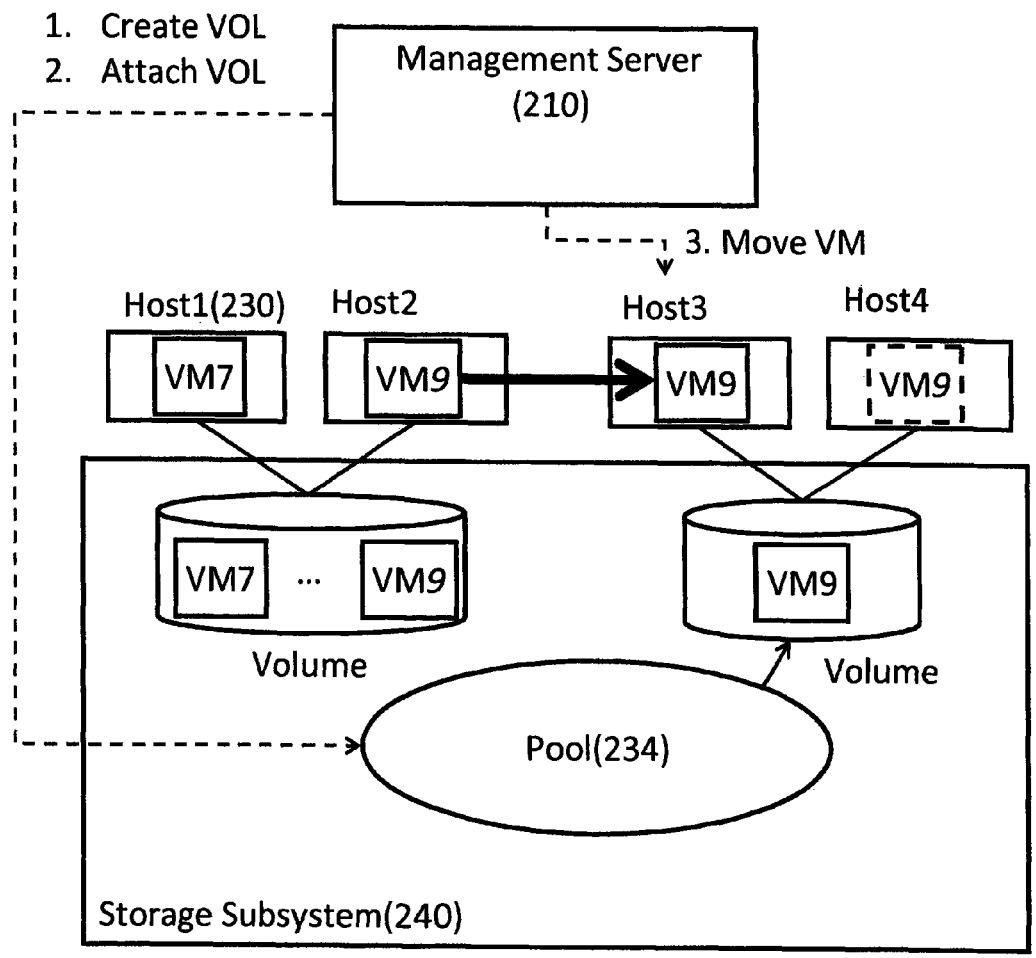
Figure 13 Scenario of Migrate from stateless to stateful

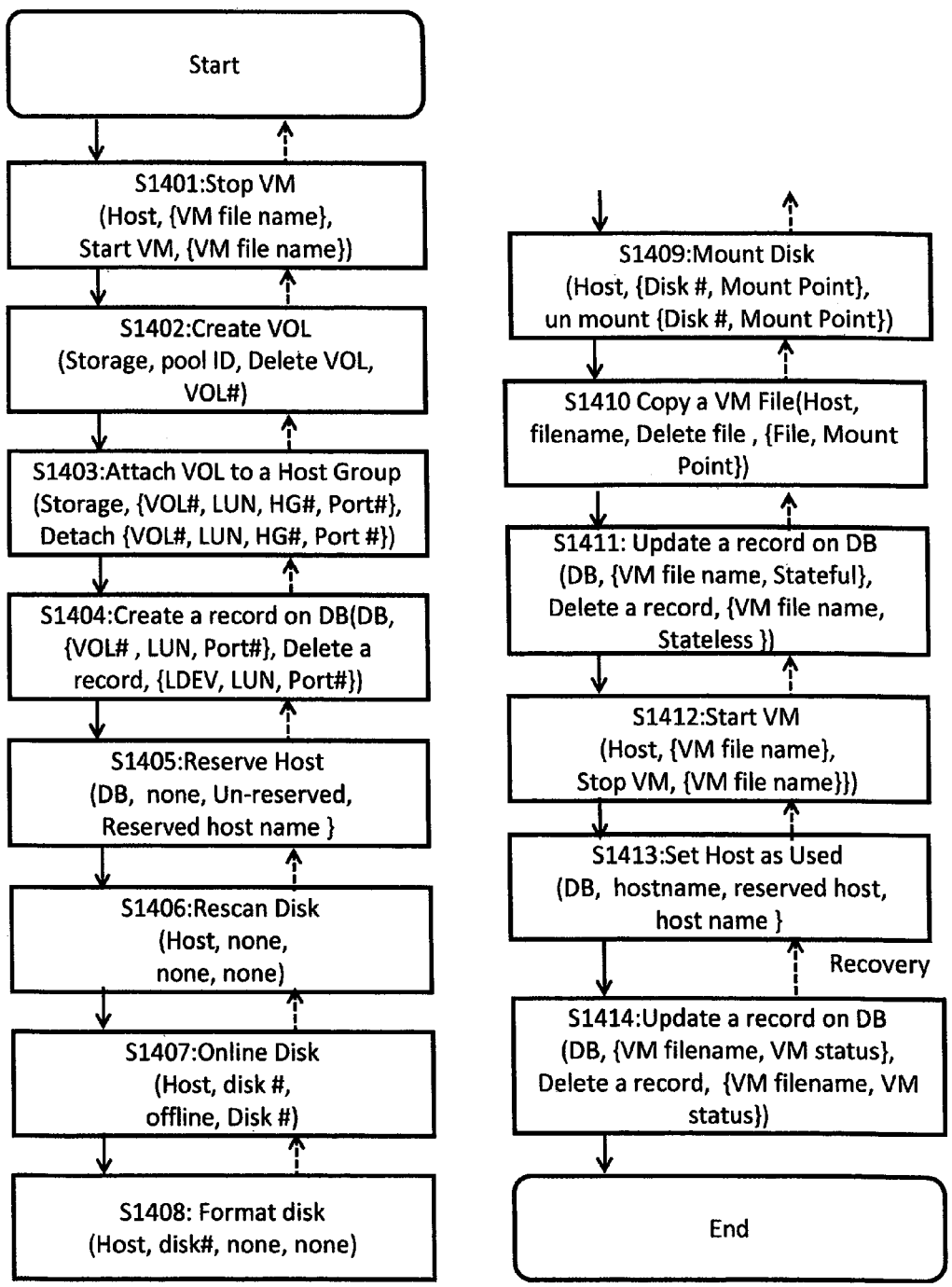
Figure 14 Migrate from stateless to stateful

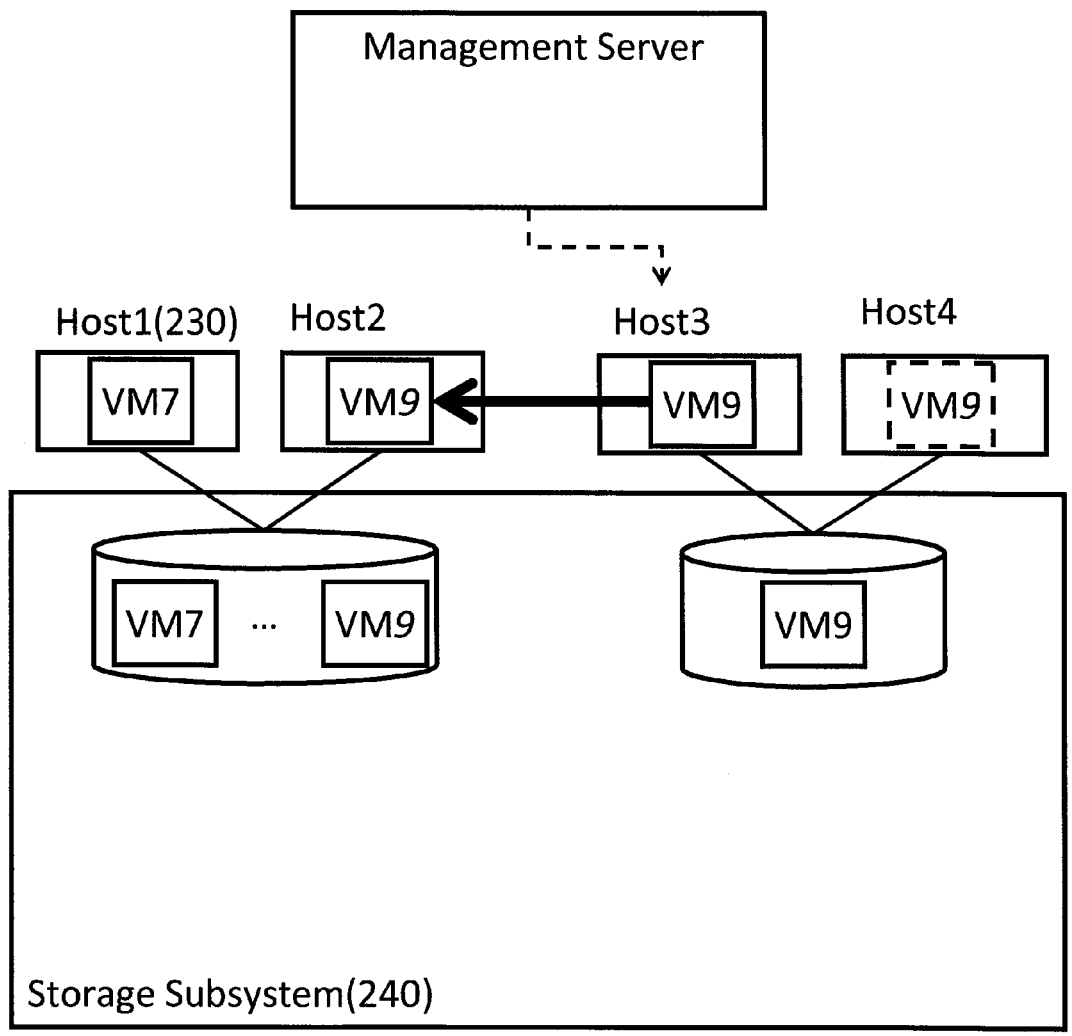
Figure 15 Scenario of Migrate from stateless to stateful

METHOD AND APPARATUS OF DATA CENTER FILE SYSTEM

BACKGROUND OF THE INVENTION

The present invention relates generally to storage systems and, more particularly, to managing a data center file system involving deployment and storage of virtual machines.

In datacenters, there are thousands of volumes which store virtual machine's images to deploy virtual machine from a storage subsystem to several hosts. Especially if one considers the deployment starting from the storage subsystem, the difficulty is further increased. This is due to the following reasons. First, the host cannot read the volume's files until the end of deploying the volume because the volume is in storage and is not attached onto the host. Second, the virtual machine (VM) may access the volume via a multipath software; the software has its own logical unit number (LUN) on top of the storage provided LUNs which provide the same volume. Therefore, the LUN provided by the storage is hidden by the multipath software's LUN. As a result, it is difficult for the host to find an expected volume.

U.S. Pat. No. 7,143,146 discloses a distributed file system to keeping track of the file's location and state. However, it does not cover the status of the volume. U.S. Pat. No. 7,096,325 discloses methods to attach volume to LUN and detach volume from LUN. However, it does not discuss the status of the volume specified by a file which is on the volume. U.S. Pat. No. 7,555,644 is directed to system and method for operating system image provisioning in a utility computing environment and discloses a technique for provisioning OS image a boot up of a computing server using a pool for OS image copied volume. FIG. 1 of that patent shows a procedure of managing the pool. However, that patent assumes the volume is already attached on the system and does not consider the volume's state.

BRIEF SUMMARY OF THE INVENTION

Exemplary embodiments of the invention provide a capability to validate volume status on the host and storage system stored virtual machine image in the datacenter management server. The datacenter management server has a database. The database has a record for a virtual machine's image file (e.g., VHD file). The record has identifiers and status on the host and on the storage. The identifiers are used to verify each executed operation to access file data. The key identifier is the partition GUID. Another related identifier is the volume number managed in the storage subsystem and LUN. Using these parameters, the datacenter management server determines the status. The status on the host is "success" or "failure" based on the identifier of volume such as partitioned GUID, LUN which can be confirmed on diskpart tool, or volume number such as logical device number (LDEV) via Windows Management Instrumentation. The volume status for volume on storage is attached LUN or detached. The status can be confirmed via the storage subsystem's API as success or error condition. Using these key statuses, the virtual machine management server verifies these statuses on virtual machine deployment and storing.

One aspect of the present invention is directed to a method of managing a server system which includes a storage system having a plurality of volumes, a plurality of host systems, and a management server coupled with the storage system and the host systems via a network. The method comprises: generating a golden image in the storage system corresponding to a virtual machine image file; copying virtual machine data from the golden image to some of the plurality of volumes in the storage system; and keeping track, by the management server, of status of the volumes which have copied virtual machine data by monitoring activity of the virtual machines. If the activity of a monitored virtual machine is start of deployment of the virtual machine (VM), the keeping track comprises checking if the status of a volume storing the VM data to be used for deploying the virtual machine from the storage system is in a volume pool and not attached to a target LUN (logical unit number) via storage management API before execution of deployment of the virtual machine. If the activity of a monitored virtual machine is deployment of the virtual machine before starting the virtual machine, the keeping track comprises checking if the status of a volume storing the VM data to be used for deploying the virtual machine from the storage system is "attached" as a volume that has been attached for a host system to which the virtual machine is to be deployed. If the activity of a monitored virtual machine is end of storing the virtual machine, the keeping track comprises checking if the status of a volume storing the VM data that was used for deploying the virtual machine from the storage system is detached from a target LUN (logical unit number) and is in a volume pool via storage management API.

In some embodiments, the golden image is generated using storage capability of the storage system pursuant to input from a VM administrator without input from administrator of the storage system or administrator of the management server. The method further comprises, prior to copying VM data from the golden image to some of the plurality of volumes in the storage system: creating each of the plurality of volumes for storing VM data; and attaching each of the created volumes to a host group which is a group of host systems that have the host systems' WWNs (World Wide Names) that can be mapped to volumes. The method further comprises, subsequent to copying VM data from the golden image to some of the plurality of volumes in the storage system: detaching each of the volumes from the host group; and reserving host for VM by selecting an unused or shared core from a host list showing for each host system (1) a core which resides on the host system's processor and has usage by VM, and (2) a status which stores a name of any virtual machine which uses the core or no entry if the core is not used by any virtual machine, so as to make dedicated VM deployment for a target core by inserting a reserved state for the VM in the selected core. The method further comprises, subsequent to the detaching and reserving: attaching each of the detached volumes to the host group; updating VM filename for each of the attached volumes; rescanning disk in the storage system to discover one or more new volumes for host, each of the one or more new volumes being "discovered" as a volume that has been discovered for a host system to which a virtual machine is to be deployed; bringing the rescanned disk online based on the discovered volumes; and mounting the online disk. The method further comprises, subsequent to the rescanning, bringing, and mounting: starting VM image based on the mounted disk; setting host to used by inserting in the host list VM name in place of the reserved state for the started VM in the selected core; and updating the VM filename for each of the volumes for the started VM.

In specific embodiments, the method further comprises: before attaching a volume to a host group, checking connection status of the host group for the volume to be attached to determine if the volume is not already attached; and before detaching a volume from a host group, checking connection status of the host group for the volume to be detached to determine if the volume is attached. The method further comprises validating cluster configuration of the host group by checking WWNs of the host systems in the host group. The method further comprises, if the activity of a monitored virtual machine is start of deployment of the virtual machine: determining if a number of the WWNs of the host systems is at least two and determining whether a number of ports in the storage system is at least two; and if there are not at least two WWNs and at least two ports in the determining, storing operated variables of the deployment of the virtual machine and performing recovery using the stored operated variables. The method further comprises, if the activity of a monitored virtual machine is start of deployment of the virtual machine: determining whether there is an available core to deploy VM and, if yes, selecting an available core by inserting a reserved state for the VM in the selected core and, if no, sending an alert on failure to find an available core.

Another aspect of the invention is directed to a management server which is coupled with a storage system and host systems via a network, the storage system having a plurality of volumes. The management server comprises a processor; a memory; and a plan executor to execute plans to: generate a golden image in the storage system corresponding to a virtual machine image file; copy virtual machine data from the golden image to some of the plurality of volumes in the storage system; and keep track, by the management server, of status of the volumes which have copied virtual machine data by monitoring activity of the virtual machines. If the activity of a monitored virtual machine is start of deployment of the virtual machine (VM), the keeping track comprises checking if the status of a volume storing the VM data to be used for deploying the virtual machine from the storage system is in a volume pool and not attached to a target LUN (logical unit number) via storage management API before execution of deployment of the virtual machine. If the activity of a monitored virtual machine is deployment of the virtual machine before starting the virtual machine, the keeping track comprises checking if the status of a volume storing the VM data to be used for deploying the virtual machine from the storage system is "discovered" as a volume that has been discovered for a host system to which the virtual machine is to be deployed. If the activity of a monitored virtual machine is end of storing the virtual machine, the keeping track comprises checking if the status of a volume storing the VM data that was used for deploying the virtual machine from the storage system is detached from a target LUN (logical unit number) and is in a volume pool via storage management API.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of an information system.

FIG. 2 illustrates an example of a logical configuration applied to the architecture of FIG. 1.

FIG. 3 shows an example of the port configuration table.

FIG. 4 shows an example of a VM (Virtual Machine) file table.

FIG. 5 shows an example of a target host list in the form of a table.

FIG. 6 shows an example of a flow diagram illustrating the process of an act as a normal process.

FIG. 7 shows an example of a flow diagram illustrating the process of an act as a recovery process.

FIG. 8 shows an example of a flow diagram for a plan to create golden Image.

FIG. 9 shows an example of a flow diagram illustrating a plan to create a VM and deploy the VM.

FIG. 10 shows an example of a flow diagram illustrating a plan to execute Store VM.

FIG. 11 shows an example of a table for the operation of error condition for each component in the information system.

FIG. 12 shows a GUI (Graphical User Interface) for the VM administrator to manage changes to the state of the VM.

FIG. 13 shows a scenario to migrate the VM state from stateless to stateful.

FIG. 14 shows an example of a flow diagram illustrating a migration plan from stateless to stateful for the VM state as seen in FIG. 13.

FIG. 15 shows an example of a scenario to migrate the VM state from stateful to stateless.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing a data center file system involving deployment and storage of virtual machines.

FIG. 1 illustrates an example of a hardware configuration of an information system. This system has personal computers (PCs) including a management server 110 and at least one host 130, and a storage subsystem 140. The PCs connect to the storage subsystem 140 via a network 260 such as a SAN (Storage Area Network). The SAN is typically a fiber channel network, and hence includes a Fiber Channel Switch and cables. The SAN may use IP network such as iSCSI. In this case, we use Ethernet cables and Ethernet switch as the network switch. The PCs 110, 130 and storage subsystem 140 are connected by a LAN (Local Area Network) 270. The LAN uses Ethernet network in this embodiment, and it includes Ethernet switch and cables.

Each PC 110, 130 is a general computer, and includes a CPU, a memory, and a disk. It has a Host Bus Adapter (HBA) for storage to connect to the SAN 260. The HBA has a unique identifier in the form of world wide name (WWN). The PC also has a Network Interface Card (NIC) to connect to the LAN 270. The NIC has a MAC address.

The storage subsystem 140 has storage processors (MPs) 160, disks 143, memories 170, ports 180 to connect to the SAN 260, and SerVice Processor (SVP) 150. The ports, MPs, disks, and memories are connected by an internal bus 142. The memory is NVRAM in this embodiment. The port, memory, disk, MP, SVP, and internal bus can be redundant for system reliability. The MP 160 has a CPU, a local memory, and a NIC. Using this NIC, the MP 160 can communicate with the SVP 150. The SVP 150 has two NICs for an internal LAN 190 and the external LAN 270, CPU, memory 170, and disk 143.

FIG. 2 illustrates an example of a logical configuration applied to the architecture of FIG. 1. The system has a virtual management server or simply management server 210, a virtual machine (VM) runnable server or host 230, and a storage subsystem 240. The management server may use the PC 110 in FIG. 1.

The management server has a web portal server (not shown), a plans executer 211, and a VM file state table 212. The web portal server represents a GUI for the VM administrator to create VM and deploy VM. Based on the user's request, an OS Images Pool Management module (not shown) executes the Deploy Virtual Machine process (Deploy VM process). The Deploy VM process detaches a volume, which is already a copied golden image, from a dummy port, attaches the volume on the host, discovers the volume on the host's OS, and then the VM runnable hypervisor executes to start the VM on the volume. The golden image is pre-created by a Golden Image Creator (not shown) based on the schedule of the OS images Pool Management module. The plans executer 211 helps to execute several plans at a time considering concurrency for each act. The act is atomic operation. The act runs on each core on the management server 210. The act preserves the executed state for recovery operation in case of plan execution failure.

On the hosts 230, there is an operating system or OS (not shown), a hypervisor, and HA (High Availability) software.

On the storage subsystem 240, there is a port configuration table 243 and a virtual volume pool 234 as the configuration information. The storage subsystem 240 may use Hitachi's Universal Platform V or Hitachi's Virtual Platform which is runnable with Thin Provisioning Technology such as Hitachi Dynamic Provisioning (HDP). Other storage subsystems can also be used. Based on the port configuration 243, the storage subsystem 240 configures a dummy group on one port and a host group on another port. A host group is a group of hosts which have the hosts' WWNs that can be mapped to volumes. We discuss later how to configure the ports. On the dummy group, there are several volumes which are golden image and target volumes. On the host group, there are several Host attached volumes. The creation of the target volume from the golden image will be discussed below. To manage the storage subsystem 240, there is management API such as RMI I/F (Interface). For ease of use of the API, there may be conversion from RMI I/F to XML I/F using a proxy server such as Hitachi's Device Manager which represents XML I/F.

With the equipment provided in the system shown, the management server 210 executes the (A) create & deploy VM, (B) store VM, and (C) deploy VM operations by issuing requests to the storage subsystem 240 and hosts 230. The movement of data is executed on the storage system 240. In the create and deploy VM operation, the storage system 240 copies VM data from the golden image to a new volume, and it re-attaches the volume to the host group in order to deploy the VM. In the store VM operation, it detaches the volume from the host group and attaches the volume to the host group. The details of these operations are discussed below (see FIG. 10).

FIG. 3 shows an example of the port configuration table 243. The port configuration table 242 has columns of Port Number 301, Host Group Number 302, Name for the Host Group Number 303, Host World Wide Name (WWN) 304, LUN 305, and V-VOL (Virtual Volume) number 306. The information is managed in the storage subsystem 240. The port identified by the Port Number 301 corresponds to the physical port 180 in FIG. 1. The Host Group Number (a.k.a. Host Domain Name in Hitachi products) is on each port to make a group of hosts using the host's world wide name (WWN). The host's WWN is provided by the host's HBA's port in order to specify between the host's port connection and the HBA's port connection. LUNs are on a host group. Therefore, each host group has several LUNs. The LUN is connected to volume (VOL). The VOL number is unique within the storage subsystem. The volume number is shared by several LUNs on different ports' host group to ensure keeping multipath configuration for parallel performance and failover among ports.

On the port, the microcode creates virtual port group as host group (dummy group 241 and host group 242 in FIG. 2). The dummy host group 241 is for copying data to prohibit access from any host. Therefore, the datacenter management software system assigns a dummy WWN such as 0x0000000000000001 on a dummy host group 241. On the other hand, a host group 242 has the corresponding host's WWN to allow access from that host 242. On the host group, the storage subsystem 240 attaches a VOL to a LUN. For a cluster configuration, the volume can be assigned to several host groups on different ports. For example, host 1 is connected to port 1 and port 2, and host 2 is connected to port 1 and port 2. Each host group on each port has host 1's WWN and host 2's WWN. As such, each host group can be attached to a single volume using the same LUN or different LUNs. While the use of these ports, LUNs, and host groups 242 is known in the art, the use of the dummy host group 241 is novel.

FIG. 4 shows an example of a VM (Virtual Machine) file table 212. The table has columns of the VM's Filename 401, Signature for volume 402, the deploy VM's type/state 403 which is stateful or stateless (details discussed below), Golden Image Flag 404, Volume number 405, LUN 411 for the volume, Target Host name 406, Target Core Number 407 to run VM, VM Operation State 408, Current Step Operation 409, and Status 410 for the current operation.

The table presents the current state of VM files with filenames 401. The file is coupled with a signature 402 to find the volume of location for the file. The signature is a disk signature in the case of MBR format or partitioned GUID in the case of GPT (GUID Partition Table) partition format. This signature uses identical volume to storage the VM file. The file has state 403 as stateful which uses storage capability for VM operations and stateless which is for use with just the host's hypervisor capabilities. The file has a special attribute as golden image 404 which is the master of VM file data. To specify the disk location in the storage subsystem 240, the file has volume number 405, and LUN 411 for the volume to represent an address to the host and port for the LUN. Regarding the host group number, the datacenter management software server 210 can discover it in the storage subsystem 240 using the volume number 405 and port number 412 and using the port configuration table 243 of FIG. 3 via Storage API such as XML or RMI API.

The file resides on the target core number 407 of the target host 406. The target host 406 can be a name or an Internet Protocol address. The core number 407 can be shared if the datacenter management software server's administrator select as "Shared" core among several Hypervisors. The operation status is VM operation state 408. Also the file needs to represent current execution step as current step operation 409 for the status 410 which is a success or failure. FIG. 4 does not show a directory for the file. It may add the directory information to specify the file on volume signed by the signature 402.

Moreover, we can share several VMs with a volume. In this situation, the management server checks that all VMs' states are "stored" state before attaching or detaching the volume in which VMs is resident. For example, on attaching or detaching the volume, the management server needs to check that all VMs on the volume are "stored" in VM operations. The step should be executed for every attach or detach operation in Deploy VM or Store VM. Examples are S908 and S1006. On the recovery case, we should keep track of the stored state for volume operation as well as the normal case.

FIG. 5 shows an example of a target host list in the form of a table. The host table is stored in the management server 210 (see FIG. 2), and it includes columns of host 501, core 502, and status 503. The host 501 is the name of the host or the IP address of the host. The core 502 resides on the host's CPU. The CPU may be a multicore processor. Each core has usage by VM. In use, there is the name of the VM's name such as removing file extension. When not in use, there is no entry. In deploying or storing, the state is reserved because the core would be used after deploy or in case of failure of store as recovery. The benefit of this reservation is that the VM administrator can make dedicated VM deployment for target core.

As shown in FIG. 2, the working of the datacenter management software system includes the plans executor 211. A plan has a series of acts. FIG. 6 shows an example of a flow diagram illustrating the process of an act as a normal process. In S601, the act executes the act's operations. The operation is defined for each act. This is discussed in the plan's description (see FIGS. 8, 9, 10, and 14). In S602, the act determines if the execution is a success or not. If it is a success, the process goes to S603. If it is a failure, the process goes to S604. In S603 (success), the act stores the executed variables in local act instance to use in case of recovery operation. In S604 (failure), the act informs the plan to execute undo operation in the previous executed act.

FIG. 7 shows an example of a flow diagram illustrating the process of an act as a recovery process. In S701, the act restores the executed variables in their local instance. In S702, the act executes the recovery operation using the restored variables. The recovery operation is discussed in the plan's description (see FIGS. 8, 9, 10, and 14).

Using the acts, the management server 210 executes the plans. There are three major plans as enabling the datacenter management software features. These features are discussed using plan execution steps. They include plans to create golden image (FIG. 8), create and deploy VM (FIG. 9), and store VM (FIG. 10).

FIG. 8 shows an example of a flow diagram for a plan to create golden Image. The box shows the act's execution (2001 as shown in the Index) which is executed in S601 of FIG. 6. There is target equipment or software (2002) and variables (2003) on execution. For recovery, there is also the act's recovery execution (2004), which is executed in S701 of FIG. 7 and recovery variables (2005) which are stored in S603 of FIG. 6. Based on the act, the plan executes subsequent acts that follow. In FIGS. 8, 9, 10, and 14, we use solid line for normal operation and dashed line for recovery operation.

In S801, the plan executes the Create volume act. The act executes the create volume operation by specifying the storage pool number. The storage returns the volume number to store the data if the operation is a success. The number is stored in local instance. If there is a failure of the act (e.g., out of pool capacity), the plan does not execute. In the case of recovery based on failure on the next step, this act executes to delete volume based on stored variables.

In S802, the plan executes the Attach VOL to a host group act. The act executes the storage 240 to attach volume to the host group by specifying the volume number, LUN, Host Group (HG) Number, and Port Number. The storage returns the result which is a success or failure. Also, before the Attach VOL is executed, the plan may execute to check if the volume is not already attached unintended HG or not using XML API in order to ensure the act process. The XML API provides HG information for volume number to show a relation between HG (referred to as Path between SCSI's LUN and volume) and volume. If it is a success, the act stores executed variables in the act's local instance. If it is a failure, the act informs the failure to the plan. The plan executes the executed act's recovery, which is S801, based on the executed order. In the case of recovery based on failure on the next step, this act executes to detach VOL from the host group based on stored variables. Also, before the Detach VOL is executed, the plan may execute to confirm if the volume is already attached HG or not using XML API in order to ensure the act process.

In S803, the plan executes the Create a record on the act of the DB (database). The act executes the DB in the datacenter management software server 210 to create a record of the empty VM which has the VOL#, LUN, and Port#. If the execution is a success, the act stores the executed variables in their local instance. If the execution is a failure, the act informs the failure to the plan. The plan executes the executed act's recovery which is from S802 back to start, based on the executed order. In the case of recovery based on failure on the next step, this act executes to delete the record based on stored variables.

In S804, the plan executes the Rescan Disk act. The act executes the host 230 to rescan disk operation to discover new volumes as the host's disk. Regarding the discovery, the host 230 may use the volume number (generally referred to as Device Identification) through SCSI inquiry's Page 83 or LUN. If the execution is a success, the act does not store anything. If it is a failure to find the volume as a new disk on the host, the act informs the failure to the plan. The plan executes the executed act's recovery which is from S803 back to start, based on the executed order. In the case of recovery based on failure on the next step, this act does not execute anything.

In S805, the plan executes the Online Disk act. The act executes the host 230 to online disk based on the discovered volume. If the execution is a success, the act stores the disk number. If it is a failure, the act informs the failure to the plan. The plan executes the executed act's recovery which is from S804 back to start, based on the executed order. In the case of recovery based on failure on the next step, this act executes to offline disk by specifying the disk number based on stored variables.

In S806, the plan executes the Format Disk act. The act executes the host 230 to format disk based on the online disk. If the execution is a success, the act stores disk number. If it is a failure, the act informs the failure to the plan. The plan executes the executed act's recovery which is from S805 back to start, based on the executed order. The plan executes the executed act's recovery which is from S805 to start, based on the executed order. In the case of recovery based on failure on the next step, this act does not execute anything.

In S807, the plan executes the Mount Disk act. The act executes the host 230 to mount disk based on the formatted disk. If the execution is a success, the act stores the disk number and mount point. If it is a failure, the act informs the failure to the plan. The plan executes the executed act's recovery which is from S806 back to start, based on the executed order. In the case of recovery based on failure on the next step, this act executes to un-mount disk by specifying the mount point based on stored variables.

In S808, the plan executes the Copy a VM act. The act executes the host 230 to copy a VM image to the mounted disk. If the execution is a success, the act stores the filename. If it is a failure (e.g., due to lack of pool 234 capacity based on threshold storage system), the act informs the failure to the plan. The plan executes the executed act's recovery which is from S807 back to start, based on the executed order. In the case of recovery based on failure on the next step, this act executes to delete the VM file by specifying the filename based on stored variables.

In S809, the plan executes the Update a record on the DB act. The act executes the DB to update the VM filename for the VOL# in the storage. If the execution is a success, the act stores the filename. If it is a failure, the act informs the failure to the plan. The plan executes the executed act's recovery which is from S808 back to start, based on the executed order. In the case of recovery based on failure on the next step, this act executes to update a record to initialize the record.

In S810, the plan executes the Un-mount Disk act. The act executes the host 230 to un-mount the disk by specifying the mount point. If the execution is a success, the act stores the filename. If it is a failure, the act informs the failure to the plan. The plan executes the executed act's recovery which is from S809 back to start, based on the executed order. In the case of recovery based on failure on the next step, this act executes to mount disk specifying the disk number and the mount point based on stored variables.

In S811, the plan executes the initialize signature act. The act executes the host 230 to initialize signature for the online disk by specifying the disk number. If the execution is a success, the act does not store anything. If it is a failure, the act informs the failure to the plan. The plan executes the executed act's recovery which is from S810 back to start, based on the executed order. In the case of recovery based on failure on the next step, this act does not execute anything.

In S812, the plan executes the offline disk act. The act executes the host 230 to offline disk by specifying the disk number. If the execution is a success, the act stores the disk number. If it is a failure, the act informs failure to the plan. The plan executes the executed act's recovery which is from S811 back to start, based on the executed order. In the case of recovery based on failure on the next step, this act executes to online disk by specifying the disk number based on stored variables.

In S813, the plan executes the Update a record on the DB act. The act executes the DB to update signature for the VOL# in the storage. If the execution is a success, the act does not store anything. If it is a failure, the act informs the failure to the plan. The plan executes the executed act's recovery which is from S812 back to start, based on the executed order.

There are two benefits in this plan. First, the VM administrators can create golden image using the storage capability without negotiating with the storage administrator and server administrator. Second, multiple administrators do not have to remember their operations, and hence human errors in missing operations are decreased in the complex system under the data center.

FIG. 9 shows an example of a flow diagram illustrating a plan to create a VM and deploy the VM. With this plan, the VM administrator can create a VM image using the storage's copy capability and deploy the VM using the storage's volume mapping capability (attach and detach VOL for host group). The benefit is that the VM administrator can execute create volume and deploy volume without the storage administrator and server administrator. The index and usage of act are the same as in FIG. 8.

In S901, the plan executes the Create volume act. The act executes the create volume operation by specifying the storage pool number. The storage returns the volume number to store the data if the operation is a success. The volume number is stored in local instance. If there is a failure of the act (e.g., due to lack of pool capacity based on threshold in the storage system), the plan does not execute. In the case of recovery based on failure on the next step, this act executes to delete volume based on stored variables.

In S902, the plan executes the Attach VOL to a host group act. The act executes the storage 240 to attach volume to the host group 242 by specifying the volume number, LUN, Host Group (HG) Number, and Port Number. The storage returns the result which is a success or a failure. Also, before the Attach VOL is executed, the plan may execute to check if the volume is not already attached unintended HG or not using XML API in order to ensure the act process. If it is a success, the act stores the executed variables in the act's local instance. If it is a failure, act informs the failure to the plan. The plan executes the executed act's recovery, which is S901, based on the executed order. In the case of recovery based on failure on the next step, this act executes to detach VOL from the host group based on stored variables. Also, before the Detach VOL is executed, the plan may execute to check if the volume is already attached HG or not using XML API in order to ensure the act process.

The attach failure condition is shown in FIG. 11. If the LUN already is attached, the datacenter management software detects storage error via API. The target host group is a dummy host group which is listed in the port configuration table 243 of FIG. 3. The reason to attach to the dummy group is that the host's OS assigns a new signature for the volume whenever OS discovered a new volume and then the storage independently changes the signature by following copy step. In this situation, the OS confuses the signature and does not work correctly because the change of signature has happened on only storage array.

In S903, the plan executes the Create a record on the DB act. The act executes the DB in the datacenter management software server 210 to create a record of the empty VM which has the VOL#, LUN, and Port# to keep track of current volume address on storage subsystem. If the execution is a success, the act stores the executed variables in their local instance. If the execution is a failure, the act informs the failure to the plan. The plan executes the executed act's recovery which is from S902 back to start, based on the executed order. In the case of recovery based on failure on the next step, this act executes to delete the record based on stored variables.

In S904, the plan executes the Copy Volume from Golden Image to Created Volume act. The act executes the storage subsystem 240 to copy volume from the golden image volume which is created (see FIG. 8) and marked as the golden image in FIG. 4 to the created volume in S901. If the execution is a success, the act stores the executed variables in their local instance. If the execution is a failure (e.g., due to lack of pool capacity based on pool threshold or out of memory to create bitmap), the act informs the failure to the plan. The plan executes the executed act's recovery which is from S903 back to start, based on the executed order. In the case of recovery based on failure on the next step, this act executes to delete the record based on stored variables.

In S905, the plan executes the Detach VOL from a host group act. The act executes the storage 240 to detach volume from the host group 242 by specifying the volume number, LUN, Host Group (HG) Number, and Port Number. The storage returns the result which is a success or a failure. Also, before the Detach VOL is executed, the plan may execute to check if the volume is already attached HG or not using XML API in order to ensure the detach act. The XML API provides HG information for volume number to show a relation between HG (referred to as Path between SCSI's LUN and volume) and volume. If it is either a success or a failure, the act does not store any variables. If it is a failure, the act informs the failure to the plan. The plan executes the executed act's recovery, which is S903, based on the executed order. In the case of recovery based on failure on the next step, this act executes to detach VOL from the host group based on stored variables. The detach failure condition is shown in FIG. 11. If the LUN is already detached, the datacenter management software detects storage error via API. Also, before the Detach VOL is executed, the plan may execute to confirm if the volume is already attached HG or not using XML API in order to ensure the detach act.

In S906, the plan executes the Reserve Host act. The act executes the DB to select an unused or shared core from the host list of FIG. 5. If the execution is a success, the act stores the VM's name on the status 503. If it is a failure, the act informs the failure to the plan. The plan executes the executed act's recovery which is from S903 back to start, based on the executed order. In the case of recovery based on failure on the next step, this act executes to update to initialize the record to clear the reservation of host on core. The selection of the core is based on the user's choice. The user can select a shared core or a dedicated core. In the case of stateful, the datacenter management software selects a dedicate core; in the case of stateless, the datacenter management software selects a shared core.

In S907, the plan executes the Validate cluster's WWNs in host group act. The act executes the storage 240 to retrieve a list of WWNs on the port using the port configuration table of FIG. 3 and the virtual management server to check the existence of WWNs in the list. To verify the cluster configuration, it may check the number of WWNs which are the hosts' WWNs or exactly hosts' WWNs addresses. The WWN can be collected for each host using OS's management interface. If it is either a success or a failure, the act does not store any variables. If it is a failure, the act informs the failure to the plan. The plan executes the executed act's recovery, which is S906, based on executed order. In the case of recovery based on failure on the next step, this act does not execute anything.

In S908, the plan executes the Attach VOL to a host group act. The act executes the storage 240 to attach volume to the host group 242 by specifying the volume number, LUN, Host Group (HG) Number, and Port Number. The storage returns the result which is a success or a failure. Also, before the Attach VOL is executed, the plan may execute to check if the volume is not already attached unintended HG or not using XML API in order to ensure the act process. If it is a success, the act stores the executed variables in the act's local instance. If it is a failure, the act informs the failure to the plan. The plan executes the executed act's recovery, which is S906, based on the executed order. In the case of recovery based on failure on the next step, this act executes to detach VOL from the host group based on stored variables. Also, before the Detach VOL is executed, the plan may execute to confirm if the volume is already attached HG or not using XML API in order to ensure the detach act.

In S909, the plan executes the Update a record on DB act. The act executes the DB to update the VM filename for the VOL# in the storage. If the execution is a success, the act stores the filename. If it is a failure, the act informs the failure to the plan. The plan executes the executed act's recovery which is from S908 back to start, based on the executed order.

In the case of recovery based on failure on the next step, this act executes to update a record to initialize the record.

In S910, the plan executes the Rescan Disk act. The act executes the host 230 to rescan disk operation to discover new volumes as the host's disk. Regarding the discovery, the host may use the volume number through the SCSI inquiry's Page 83 or LUN to verify. If the execution is a success, the act does not store anything. If it is a failure to find the volume as a new disk on the host (also may include incorrect volume number), the act informs the failure to the plan. The plan executes the executed act's recovery which is from S909 back to start, based on the executed order. In the case of recovery based on failure on the next step, this act does not execute anything.

In S911, the plan executes the Online Disk act. The act executes the host 230 to online disk based on the discovered volume. If the execution is a success, the act stores the disk number. If it is a failure, the act informs the failure to the plan. The plan executes the executed act's recovery which is from S910 back to start, based on the executed order. In the case of recovery based on failure on the next step, this act executes to offline disk by specifying the disk number based on stored variables. The online disk failure condition is shown in FIG. 11. If the disk is already online, the datacenter management software detects the status via the OS's I/F.

In S912, the plan executes the Mount Disk act. The act executes the host 230 to mount disk based on the online disk. If the execution is a success, the act stores the disk number and mount point. If it is a failure, the act informs the failure to the plan. The plan executes the executed act's recovery which is from S911 back to start, based on the executed order. In the case of recovery based on failure on the next step, this act executes to un-mount disk by specifying the mount point based on stored variables. The mount failure condition is shown in FIG. 11. If the mount point is already used, the datacenter management software detects the status via the OS's management interface.

In S913, the plan executes the Start VM act. The act executes the host 230 to start a VM image to the mounted disk. If the execution is a success, the act stores the filename. If it is a failure (e.g., VM image does not exist or VM image is corrupted), the act informs the failure to the plan. The plan executes the executed act's recovery which is from S912 back to start, based on the executed order. In the case of recovery based on failure on the next step, this act executes to delete the VM file inputting the filename based on stored variables.

In S914, the plan executes the Set Host as Used act. The act executes the DB to insert the VM name for the specified core instead of the reserved state with the name in the host list FIG. 5. If the execution is a success, the act stores the VM's name on the status 503. If it is a failure, the act informs the failure to the plan. The plan executes the executed act's recovery which is from S913 back to start, based on the executed order. In the case of recovery based on failure on the next step, this act executes to update the record inputting the stored hostname.

In S915, the plan executes the Update a record on DB act. The act executes the DB to update the VM filename for the VOL# in the storage. If the execution is a success, the act stores the filename. If it is a failure, the act informs the failure to the plan. The plan executes the executed act's recovery which is from S914 back to start, based on the executed order. In the case of recovery based on failure on the next step, this act executes to update a record to initialize the record.

The benefits of recovery on plan include the second benefit mentioned above in connection with FIG. 8, i.e., multiple administrators do not have to remember their operations, and hence human errors in missing operations are decreased in the complex system under the data center. There are two additional benefits. First, the VM administrator can manage the offline volume by validating the attach volume and detach volume acts for the host group. Second, the VM administrator can manage the offline volume by validating the host cluster configuration using WWNs on the host group without the storage administrator and server administrator.

FIG. 10 shows an example of a flow diagram illustrating a plan to execute Store VM. With this plan, the VM administrator can create a VM image using the storage's copy capability and store the VM using the storage's volume mapping capability (detach VOL for the host group) after the Deploy VM plan.

In S1001, the plan executes the Stop VM act. The act executes the host 230 to stop a VM image to started VM on the deploy VM process. If the execution is a success, the act stores the filename. If it is a failure, the act informs the failure to the plan. The plan finishes executing this plan by error. In the case of recovery based on failure on the next step, this act executes to restart the VM specifying the filename based on stored variables.

In S1002, the plan executes the Update a record on DB act. The act executes the DB to update the VM filename for the VOL# in the storage. If the execution is a success, the act stores the filename. If it is a failure, the act informs the failure to the plan. The plan executes the executed act's recovery which is from S1001 back to start, based on the executed order. In the case of recovery based on failure on the next step, this act executes to update a record inputting the stored variables.

In S1003, the plan executes the Un-mount Disk act. The act executes the host 230 to un-mount the disk by specifying the mount point. If the execution is a success, the act stores the filename. If it is a failure (e.g., already unmounted), the act informs the failure to the plan. The plan executes the executed act's recovery which is from S1002 back to start, based on the executed order. In the case of recovery based on failure on the next step, this act executes to mount disk by specifying the disk number and the mount point based on stored variables. The un-mount failure condition is shown in FIG. 11. If the disk is already un-mount, the datacenter management software detects the status via the OS's management interface.

In S1004, the plan executes the offline disk act. The act executes the host 230 to offline disk by specifying the disk number. If the execution is a success, the act stores the disk number. If it is a failure, the act informs the failure to the plan. The plan executes the executed act's recovery which is from S1003 back to start, based on the executed order. In the case of recovery based on failure on next step, this act executes to online disk by specifying the disk number based on stored variables. The offline disk failure condition is shown in FIG. 11. If the disk exists, the datacenter management software detects the status via the OS's management interface.

In S1005, the plan executes the Update a record on DB act. The act executes the DB to update the disk status as offline for the VM filename's disk. If the execution is a success, the act stores the state of online based on the disk#. If it is a failure, the act informs the failure to the plan. The plan executes the executed act's recovery which is from S1003 back to start, based on the recovery order which is indicated in dashed line. In the case of recovery based on failure on the next step, this act executes to update the record inputting the VM filename based on stored variables.

In S1006, the plan executes the Detach VOL from a host group act. The act executes the storage 240 to detach volume from the host group 242 by specifying the volume number, LUN, Host Group (HG) Number, and Port Number. The storage returns the result which is a success or a failure. Also, before the Detach VOL is executed, the plan may execute to check if the volume is already attached HG or not using XML API in order to ensure the act process. If the execution is a success, the act stores the VOL#, LUN, HG#, and Port#. If it is a failure, the act informs the failure to the plan. The plan executes the executed act's recovery which is from S1008 back to start, based on the recovery order which is indicated in dashed line. In the case of recovery based on failure on the next step, this act executes to attach volume by specifying the volume number, LUN, Host Group (HG) Number, and Port Number based on stored variables. The detach failure condition is shown in FIG. 11. If the LUN is already detached, the datacenter management software detects storage error via API.

In S1007, the plan executes the Update a record on DB act. The act executes the DB to update the LUN, HG#, Port for VOL# as detach LUN# "-", HG# "-" and Port # "-" in FIG. 4 which lists the VOL#405, LUN 411, HG#406, and Port#412. If the execution is a success, the act stores the VOL#, LUN, HG# and Port#. If it is a failure, the act informs the failure to the plan. The plan executes the executed act's recovery which is from S1004 back to start, based on the recovery order which is indicated in dashed line. In the case of recovery based on failure on the next step, this act executes to update the record inputting the VOL#405, LUN 411, HG#406, and Port#412 based on stored variables.

In S1008, the plan executes the Rescan Disk act. The act executes the host 230 to perform the rescan disk operation to detached volumes in S1006 as the host's disk. If the execution is a success, the act does not store anything. If it is a failure to find the volume as a new disk on the host, the act informs the failure to the plan. The plan executes the executed act's recovery which is from S1007 back to start, based on the recovery order which is indicated in dashed line. In the case of recovery based on failure on the next step, this act executes to rescan and discover a disk.

In S1009, the plan executes the Release Host act. The act executes the DB to remove the VM name on the host list of FIG. 5. If the execution is either a success or a failure, the act does not store anything. If it is a failure, the act informs the failure to the plan. The plan executes the executed act's recovery which is from S1008 back to start, based on the recovery order. In the case of recovery based on failure on the next step, this act executes to update a record to initialize the record.

There are two benefits in this plan as well as the act's recovery benefit. First, the VM administrator can store the VM detach volume on the storage without negotiating with the storage administrator and server administrator. Second, the VM administrator can well manage the detach volume even if there is a storage administrator because there is S1006.

In the case of only Deploy VM, the datacenter management software executes as a plan from S906 to S915 in FIG. 10. The recovery operation is the same as written from S906 to S915 in FIG. 10.

The VM administrator may want to change the state of the VM from stateless to stateful or from stateful to stateless. This is discussed in the following.

FIG. 12 shows a GUI (Graphical User Interface) for the VM administrator to manage changes to the state of the VM. The GUI includes VM Name 1201, Operation Status 1202, Detail Status 1207, Current State 1203, Button to show selectable pull down list 1204, Cancel button 1205 to discard the changes and OK button 1206 to execute changes. The VM Name 1201 shows the Filename 401 without the extension on DB (FIG. 4). The Operation status 1202 is VM operation state 408 in the DB. The Current State 1203 is State 403 in the DB. The VM administrator selects the next state for each VM using the selectable pull down list button 1204 and pushes the OK button 1206 to execute the change. If the VM administrator wants to discard the change, he or she may push the cancel button 1205 to discard the changes. Also in the Detail Status 1207, the administrator can see the management software's current detail status such as storage related operations. This information comes from Current Step Operation 409 in FIG. 4.

FIG. 13 shows a scenario to migrate the VM state from stateless to stateful. Based on the user's request via the GUI, the datacenter management software server 210 requests the storage 240 to create a volume and to attach the volume for a host or hosts 230 in case of clusters. The datacenter management software server 210 requests the target hosts, to which are attached the volume, to format the file system in the volume (i.e., disk in OS), mount it on the local file system, copy the VM image from the source host, and start VM on the virtual machine.

FIG. 14 shows an example of a flow diagram illustrating a migration plan from stateless to stateful for the VM state as seen in FIG. 13.

In S1401, the plan executes the Stop VM act. The act executes the host 230 to stop a VM image to started VM on the deploy VM process. If the execution is a success, the act stores the filename. If it is a failure, the act informs the failure to the plan. The plan finishes this plan and returns error to execute this plan. In the case of recovery based on failure on the next step, this act executes to restart the VM by specifying the filename based on stored variables.

In S1402, the plan executes the Create volume act. The act executes the create volume operation by specifying the storage pool number. The storage returns the volume number to store the data if the operation is a success. The number is stored in local instance. If it is a failure, the act informs the failure to the plan. The plan executes the executed act's recovery, which is S1401, based on the executed order. In the case of recovery based on failure on the next step, this act executes to delete volume based on stored variables. In the creation of volume, the datacenter management software may specify the volume size based on the VM file size and other related size like filesystem metadata and configuration tool file.

In S1403, the plan executes the Attach VOL to a host group act. The act executes the storage 240 to attach volume to the host group 242 by specifying the volume number, LUN, Host Group (HG) Number, and Port Number. The storage returns the result which is a success or a failure. If it is a success, the act stores the executed variables in the act's local instance. If it is a failure, the act informs the failure to the plan. The plan executes the executed act's recovery, which is S1402, based on the executed order. In the case of recovery based on failure on the next step, this act executes to detach VOL from the host group based on stored variables. The attach failure condition is shown in FIG. 11. If the LUN already is attached, the datacenter management software detects storage error via API.

In S1404, the plan executes the Create a record on DB act. The act executes the DB in the datacenter management software server 210 to create a record of the empty VM which has the VOL#, LUN, and Port#. If the execution is a success, the act stores the executed variables in their local instance. If the execution is a failure, the act informs the failure to the plan. The plan executes the executed act's recovery which is from S1403 back to start, based on the executed order. In the case of recovery based on failure on the next step, this act executes to delete the record based on stored variables.

In S1405, the plan executes the Reserve Host act. The act executes the DB to select an unused or shared core from the host list of FIG. 5. If the execution is a success, the act stores the VM's name on the status 503. If it is a failure, the act informs the failure to the plan. The plan executes the executed act's recovery which is from S1404 back to start, based on the executed order. In the case of recovery based on failure on the next step, this act executes to update a record to initialize the record. The selection of the core is based on the user's choice. This case selects the dedicated core as stateful.

In S1406, the plan executes the Rescan Disk act. The act executes the host 230 to perform the rescan disk operation to discover new volumes as the host's disk. Regarding the discovery, the host may use the volume number through the SCSI inquiry's Page 83 or LUN to verify. If the execution is a success, the act does not store anything. If it is a failure to find the volume as a new disk on the host, the act informs the failure to the plan. The plan executes the executed act's recovery which is from S1405 back to start, based on the executed order. In the case of recovery based on failure on the next step, this act does not execute anything.

In S1407, the plan executes the Online Disk act. The act executes the host 230 to online disk based on the discovered volume. If the execution is a success, the act stores the disk number. If it is a failure, the act informs the failure to the plan. The plan executes the executed act's recovery which is from S1406 back to start, based on the executed order. In the case of recovery based on failure on the next step, this act executes the offline disk specifying the disk number based on stored variables. The online disk failure condition is shown in FIG. 11. If the disk is already online, the datacenter management software detects the status via the OS's I/F.

In S1408, the plan executes the Format Disk act. The act executes the host 230 to format disk based on the online disk. If the execution is a success, the act stores the disk number. If it is a failure, the act informs the failure to the plan. The plan executes the executed act's recovery which is from S1407 back to start, based on the executed order. In the case of recovery based on failure on the next step, this act does not execute anything.

In S1409, the plan executes the Mount Disk act. The act executes the host 230 to mount disk based on the online disk. If the execution is a success, the act stores the disk number and mount point. If it is a failure, the act informs the failure to the plan. The plan executes the executed act's recovery which is from S1408 back to start, based on the executed order. In the case of recovery based on failure on the next step, this act executes un-mount disk by specifying the mount point based on stored variables. The mount failure condition is shown in FIG. 11. If the mount point is already used, the datacenter management software detects the status via the OS's I/F.

In S1410, the plan executes the Copy a VM File act. The act executes the target host to move a VM Image file specified filename and maybe a path from the source host. If the execution is a success, the act stores the executed variables in their local instance. If the execution is a failure (e.g., due to deletion of the file), the act informs the failure to the plan. The plan executes the executed act's recovery which is from S1409 back to start, based on the executed order. In the case of recovery based on failure on the next step, this act executes to move the file to source host based on stored variables.

In S1411, the plan executes the Update a record on DB act. The act executes the DB to update the VM filename as stateful in the state 403 in FIG. 4. If the execution is a success, the act stores the state as stateless for the VM. If it is a failure, the act informs the failure to the plan. The plan executes the executed act's recovery which is from S1410 back to start, based on the executed order. In the case of recovery based on failure on the next step, this act executes to update a record by specifying stateless.

In S1412, the plan executes the Start VM act. The act executes the host 230 to start a VM image to mounted disk. If the execution is a success, the act stores the filename. If it is a failure (e.g., due to corrupted or deleted file), the act informs the failure to the plan. The plan executes the executed act's recovery which is from S1411 back to start, based on the executed order. In the case of recovery based on failure on the next step, this act executes Stop the VM file inputting the filename based on stored variables.

In S1413, the plan executes the Set Host as Used act. The act executes the DB to insert the VM name for the specified core instead of the reserved state with name in the host list of FIG. 5. If the execution is a success, the act stores the VM's name on the status 503 of FIG. 5. If it is a failure, the act informs the failure to the plan. The plan executes the executed act's recovery which is from S1412 back to start, based on the executed order. In the case of recovery based on failure on the next step, this act executes to update the record inputting the stored hostname.

In S1414, the plan executes the Update a record on DB act. The act executes the DB to update the VM's status for the VM image specified filename. If the execution is a success, the act stores the filename and status as running. If it is a failure, the act informs the failure to the plan. The plan executes the executed act's recovery which is from S1413 back to start, based on the executed order. In the case of recovery based on failure on the next step, this act executes to update a record to initialize the record.

FIG. 15 shows an example of a scenario to migrate the VM state from stateful to stateless. Based on the user's request via the GUI, the datacenter management software server 210 requests the host 230 to move the VM file to the target hosts after stop VM and restart VM. This process is the same as the general VM migration process, and it continues to request storage to detach and delete volume after migration.

The above described system ensures the status of volume, especially volume that is detached on the storage subsystem, using a file as the identifier for the volume. Also, the system prevents the conjunction by several VMs using core reserving capability on deployment. Moreover, the system improves the usability to change between SAN based VM deployment and normal VM deployment using migration capabilities.

Of course, the system configuration illustrated in FIGS. 1 and 2 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing a data center file system involving deployment and storage of virtual machines. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of managing a server system which includes a storage system having a plurality of volumes, a plurality of host systems, and a management server coupled with the storage system and the host systems via a network, the method comprising:

generating a golden image in the storage system corresponding to a virtual machine image file;

copying virtual machine data from the golden image to some of the plurality of volumes in the storage system; and keeping track, by the management server, of status of the volumes which have copied virtual machine data by monitoring activity of a virtual machine;

wherein deployment of a given virtual machine comprises attaching a volume storing virtual machine data of the given virtual machine to a target logical unit number and then starting the given virtual machine after said attaching;

wherein if the activity of the monitored virtual machine is start of deployment of the virtual machine (VM), the keeping track comprises checking if the status of a volume storing the VM data to be used for deploying the virtual machine from the storage system is in a volume pool and not attached to a target LUN (logical unit number) via storage management API before execution of deployment of the virtual machine;

wherein if the activity of the monitored virtual machine is deployment of the virtual machine (VM) and starting the virtual machine has not yet occurred, the keeping track comprises checking if the status of a volume storing the VM data to be used for deploying the virtual machine from the storage system is "attached" as a volume that has been attached for a host system to which the virtual machine is to be deployed; and wherein if the activity of the monitored virtual machine is end of storing the virtual machine (VM), the keeping track comprises checking if the status of a volume storing the VM data that was used for deploying the virtual machine from the storage system is detached from a target LUN (logical unit number) and is in a volume pool via storage management API.

2. The method according to claim 1, wherein the golden image is generated using storage capability of the storage system pursuant to input from a VM administrator without input from administrator of the storage system or administrator of the management server.

3. The method according to claim 1, further comprising, prior to copying VM data from the golden image to some of the plurality of volumes in the storage system:

creating each of the plurality of volumes for storing VM data; and attaching each of the created volumes to a host group which is a group of host systems that have the host systems' WWNs (World Wide Names) that can be mapped to volumes.

4. The method according to claim 3, further comprising, subsequent to copying VM data from the golden image to some of the plurality of volumes in the storage system:

detaching each of the volumes from the host group; and reserving host for VM by selecting an unused or shared core from a host list showing for each host system (1) a core which resides on the host system's processor and has usage by VM, and (2) a status which stores a name of any virtual machine which uses the core or no entry if the core is not used by any virtual machine, so as to make dedicated VM deployment for a target core by inserting a reserved state for the VM in the selected core.

5. The method according to claim 4, further comprising, subsequent to the detaching and reserving:

attaching each of the detached volumes to the host group;

updating VM filename for each of the attached volumes;

rescanning disk in the storage system to discover one or more new volumes for host, each of the one or more new volumes being "discovered" as a volume that has been discovered for a host system to which a virtual machine is to be deployed;

bringing the rescanned disk online based on the discovered volumes; and mounting the online disk.

6. The method according to claim 5, further comprising, subsequent to the rescanning, bringing, and mounting:

starting VM image based on the mounted disk;

setting host as used by inserting in the host list VM name in place of the reserved state for the started VM in the selected core; and updating the VM filename for each of the volumes for the started VM.

7. The method according to claim 5, further comprising:
before attaching a volume to a host group, checking connection status of the host group for the volume to be attached to determine if the volume is not already attached; and
before detaching a volume from a host group, checking connection status of the host group for the volume to be detached to determine if the volume is attached.

8. The method according to claim 4, further comprising:
validating cluster configuration of the host group by checking WWNs of the host systems in the host group.

9. The method according to claim 8, further comprising, if the activity of a monitored virtual machine is start of deployment of the virtual machine:
determining if a number of the WWNs of the host systems is at least two and determining whether a number of ports in the storage system is at least two; and
if there are not at least two WWNs and at least two ports in the determining, storing operated variables of the deployment of the virtual machine and performing recovery using the stored operated variables.

10. The method according to claim 4, further comprising, if the activity of a monitored virtual machine is start of deployment of the virtual machine:
determining whether there is an available core to deploy VM and, if yes, selecting an available core by inserting a reserved state for the VM in the selected core and, if no, sending an alert on failure to find an available core.

11. A management server which is coupled with a storage system and host systems via a network, the storage system having a plurality of volumes, the management server comprising a processor; a memory; and a plan executor to execute plans to:
generate a golden image in the storage system corresponding to a virtual machine image file;
copy virtual machine data from the golden image to some of the plurality of volumes in the storage system; and
keep track, by the management server, of status of the volumes which have copied virtual machine data by monitoring activity of a virtual machine;
wherein deployment of a given virtual machine comprises attaching a volume storing virtual machine data of the given virtual machine to a target logical unit number and then starting the given virtual machine after said attaching;
wherein if the activity of the monitored virtual machine is start of deployment of the virtual machine (VM), the keeping track comprises checking if the status of a volume storing the VM data to be used for deploying the virtual machine from the storage system is in a volume pool and not attached to a target LUN (logical unit number) via storage management API before execution of deployment of the virtual machine;
wherein if the activity of a monitored virtual machine is deployment of the virtual machine (VM) and starting the virtual machine has not yet occurred, the keeping track comprises checking if the status of a volume storing the VM data to be used for deploying the virtual machine from the storage system is "discovered" as a volume that has been discovered for a host system to which the virtual machine is to be deployed; and
wherein if the activity of a monitored virtual machine is end of storing the virtual machine (VM), the keeping track comprises checking if the status of a volume storing the VM data that was used for deploying the virtual machine from the storage system is detached from a target LUN (logical unit number) and is in a volume pool via storage management API.

12. The management server according to claim 11, wherein the golden image is generated using storage capability of the storage system pursuant to input from a VM administrator without input from administrator of the storage system or administrator of the management server.

13. The management server according to claim 11, wherein the plan executor is configured to execute plans, prior to copying VM data from the golden image to some of the plurality of volumes in the storage system, to:
create each of the plurality of volumes for storing VM data; and
attach each of the created volumes to a host group which is a group of host systems that have the host systems' WWNs (World Wide Names) that can be mapped to volumes.

14. The management server according to claim 13, wherein the plan executor is configured to execute plans, subsequent to copying VM data from the golden image to some of the plurality of volumes in the storage system, to:
detach each of the volumes from the host group; and
reserve host for VM by selecting an unused or shared core from a host list showing for each host system (1) a core which resides on the host system's processor and has usage by VM, and (2) a status which stores a name of any virtual machine which uses the core or no entry if the core is not used by any virtual machine, so as to make dedicated VM deployment for a target core by inserting a reserved state for the VM in the selected core.

15. The management server according to claim 14, wherein the plan executor is configured to execute plans, subsequent to the detaching and reserving, to:
attach each of the detached volumes to the host group;
update VM filename for each of the attached volumes;
rescan disk in the storage system to discover one or more new volumes for host, each of the one or more new volumes being "discovered" as a volume that has been discovered for a host system to which a virtual machine is to be deployed;
bring the rescanned disk online based on the discovered volumes; and
mount the online disk.

16. The management server according to claim 15, wherein the plan executor is configured to execute plans, subsequent to the rescanning, bringing, and mounting, to:
start VM image based on the mounted disk;
set host as used by inserting in the host list VM name in place of the reserved state for the started VM in the selected core; and
update the VM filename for each of the volumes for the started VM.

17. The management server according to claim 15, wherein the plan executor is configured to execute plans:
before attaching a volume to a host group, to check connection status of the host group for the volume to be attached to determine if the volume is not already attached; and
before detaching a volume from a host group, to check connection status of the host group for the volume to be detached to determine if the volume is attached.

18. The management server according to claim 14, wherein the plan executor is configured to execute plans to:
validate cluster configuration of the host group by checking WWNs of the host systems in the host group.

19. The management server according to claim 18, wherein the plan executor is configured to execute plans, if the activity of a monitored virtual machine is start of deployment of the virtual machine, to:
- determine if a number of the WWNs of the host systems is at least two and determining whether a number of ports in the storage system is at least two; and
- if there are not at least two WWNs and at least two ports in the determining, store operated variables of the deployment of the virtual machine and perform recovery using the stored operated variables.

20. The management server according to claim 14, wherein the plan executor is configured to execute plans, if the activity of a monitored virtual machine is start of deployment of the virtual machine, to:
- determine whether there is an available core to deploy VM and, if yes, select an available core by inserting a reserved state for the VM in the selected core and, if no, send an alert on failure to find an available core.

* * * * *